United States Patent
Fukushima et al.

(10) Patent No.: US 7,798,387 B2
(45) Date of Patent: Sep. 21, 2010

(54) FRICTION STIR WELDING APPARATUS AND SYSTEM

(75) Inventors: Masato Fukushima, Akashi (JP); Kazumi Fukuhara, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 12/292,624

(22) Filed: Nov. 21, 2008

(65) Prior Publication Data
US 2009/0272788 A1    Nov. 5, 2009

(30) Foreign Application Priority Data
Feb. 12, 2008    (JP) .............................. 2008-029920

(51) Int. Cl.
*B23K 20/12*    (2006.01)
(52) U.S. Cl. ..................................... 228/2.1; 228/112.1
(58) Field of Classification Search ............... 228/112.1, 228/2.1; 483/16, 28, 29, 54, 55
See application file for complete search history.

(56) References Cited

U.S. PATENT DOCUMENTS

| | | | | |
|---|---|---|---|---|
| 3,288,032 A | * | 11/1966 | Pankonin et al. ............... | 483/57 |
| 6,497,355 B1 | * | 12/2002 | Ding et al. .................... | 228/2.1 |
| 2003/0201307 A1 | * | 10/2003 | Waldron et al. .......... | 228/112.1 |
| 2006/0124691 A1 | * | 6/2006 | Wood et al. .................. | 228/2.1 |

FOREIGN PATENT DOCUMENTS

| | | |
|---|---|---|
| JP | U-55-151489 | 10/1980 |
| JP | A-2001-314982 | 11/2001 |
| JP | A-2002-137067 | 5/2002 |

* cited by examiner

*Primary Examiner*—Jessica L Ward
*Assistant Examiner*—Megha Mehta
(74) *Attorney, Agent, or Firm*—Oliff & Berridge, PLC

(57) ABSTRACT

A rotational tool retaining member unit 37 is mounted at one end portion thereof to a FSW gun body 26. The rotational tool retaining member unit 37 is provided at the other end thereof with a fitting hole 61 and a plurality of mounting passages 60 which are formed on a peripheral surface thereof such that the mounting passages 60 open on the opposite side of the one end portion and are spaced apart from each other in the circumferential direction. A mounting member unit 38 has a plurality of pin members 67. The mounting member unit 38 is mounted to the rotational tool retaining member unit 37 in such a manner that the pin members 67 are moved from the openings to the tip end portions of the mounting passages 60 and fitted thereinto. A rotational tool 33 is inserted into the mounting member unit 38. The rotational tool 33 has one end portion thereof a tie-in portion which is fitted to the fitting hole of the retaining means. The mounting member unit 38 is provided with a biasing means 69 for exerting a force on the rotational tool retaining member unit 37 to inhibit the pine members 67 from coming off the tip end portions.

7 Claims, 15 Drawing Sheets

(a)

(b)

(a)

(b)

FRICTION STIR WELDING APPARATUS AND SYSTEM

TECHNICAL FIELD

The present invention relates to a friction stir welding apparatus configured to mount a machine tool to a friction stir welding apparatus body, and a friction stir welding system comprising the same.

BACKGROUND ART

FIG. 16 is a cross-sectional view showing a rotational tool retaining member unit 1 according to a first related art. A friction stir welding gun (hereinafter referred to as "FSW gun") which is a friction stir welding apparatus according to the related art is mounted to a tip end portion of a robot by a gun adapter. The FSW gun has a C-shaped support frame. A fixed tool retaining member unit which is not shown is provided at one end portion of the support frame, while the rotational tool retaining member unit 1 is provided at the other end portion of the support frame.

The rotational tool retaining member unit 1 serves to retain a rotational tool 2. The rotational tool retaining member unit 1 includes a rotary base 3 which is fixed to a drive shaft of the FSW gun and has a tapered inner peripheral surface, a chuck member 4 which is fittingly retained by the rotary base 3 and has a tapered outer peripheral surface, and an operation member 5 which is detachably coupled to the chuck member 4 and is threadedly engaged with the rotary base 3. By rotating and axially displacing the operation member 5 relative to the rotary base 3, the inner diameter of the chuck member 4 is changed.

The rotational tool retaining member unit 1 retains the rotational tool 2 by inserting a cylindrical shaft portion 6 of the rotational tool 2 into the chuck member 4 and by rotating the operation member 5 by a hand operation to reduce the inner diameter of the chuck member 4. In such a retained state, the rotational tool 2 rotates together with the rotary base 3, so that the rotational tool 2 joined to materials can be pulled out from the materials after the friction stir welding.

The rotational tool retaining member unit 1 is configured to removably mount the rotational tool 2 by the hand operation of the operation member 5. The rotational tool 2 is changeable, for example, when it has worn out (see Japanese Laid-Open Patent Application Publications Nos. 2001-314982 and 2002-137067).

In the friction stir welding, the rotational tool 2 needs to be changed depending on the shape and quality of a portion of the materials. Changing the rotational tool 2 by the hand operation described about the first related art significantly reduces efficiency. Therefore, development of a tool changer which is capable of changing the rotational tool 2 automatically by a mechanical operation has been demanded. One example of the tool chamber may be application of a device which is capable of automatically changing a grip mounted to a robot hand at the tip end of the robot according to a second related art by a mechanical operation.

FIG. 17 is a cross-sectional view showing a robot hand 10 and a grip 15 according to the second related art. The robot hand 10 includes a vertical feed shaft 11 of a cylindrical shape, a rotational shaft 12 which is of a bottomed cylinder shape and is rotatably accommodated inside the vertical feed shaft 11, and a grip presser 14 which is accommodated inside the rotational shaft 12 and is subjected to a downward force exerted by a coil spring 13. The rotational shaft 12 opens downward and is provided at a lower end thereof with a plurality of hook-shaped grooves 12a.

The grip 15 has a shank 16 fitted into the rotational shaft 12. A plurality of rollers 17 are provided on the peripheral surface of the shank 16 to respectively correspond to the plurality of grooves 12a. A plate 18 is provided at a lower end of the shank 16. The plate 18 is mounted to an accommodating base 19 in such a way that the plate 18 is positioned by positioning pins 19a provided on the accommodating base 19.

When mounting the grip 15 to the robot hand 10, the vertical feed shaft 11 is first moved down and the shank 16 is inserted into the rotational shaft 12 while inserting the rollers 17 into openings of grooves 12a, respectively. Then, by the up-down movement of the vertical feed shaft 11 and the rotation of the rotational shaft 12, the rollers 17 are moved toward the tip end portions of the grooves 12 and fitted thereinto. The rollers 17 fitted into the tip end portions are inhibited from coming off the tip end portions, because the shank 16 is pressed down by the grip presser 14. In this manner, the grip 15 is automatically mounted to the robot hand 10 (see Japanese Utility Model Application Publication No. 55-151489).

In the friction stir welding, it is required that the materials be stirred while pressing the rotational tool 2 against the materials via the rotary base 3. The pressing force is controlled at a desired value by a controller which is not shown. When the mounting structure according to the second related art is applied to the friction stir welding apparatus according to the first related art, the rotational tool retaining member unit 1 presses down the rotational tool 2 corresponding to the grip 15 via the grip presser 14. For this reason, the pressing force exerted by the rotational tool retaining member unit 1 to the rotational tool 2 is absorbed by the coil spring 14. In order to press the rotational tool 2 with a desired pressing force, a biasing force exerted on the grip presser 14 must be taken into account. If the biasing force exerted on the grip presser 14 is taken into account, the control for the pressing force exerted by the rotational tool 2 to the materials is complex.

SUMMARY OF THE INVENTION

An object of the present invention is to provide a friction stir welding apparatus which is capable of preventing a machine tool from coming off a retaining means when the machine tool is pulled out from materials after friction stir welding and of easily controlling a pressing force exerted by the machine tool on the materials at a desired value, and a friction stir welding system comprising the friction stir welding apparatus.

A friction stir welding apparatus of the present invention which is configured to mount a machine tool to a friction stir welding apparatus body, comprises a retaining means which is mounted at one end portion thereof to the friction stir welding apparatus body and is provided with a plurality of mounting passages on a peripheral surface of the other end portion thereof, the mounting passages being arranged to be spaced apart from each other in a circumferential direction and having opening ends which open on an opposite side of the one end portion; a mounting means having a plurality of mounting members which are respectively inserted through the opening ends of the plurality of mounting passages and are respectively fitted to tip end portions of the plurality of mounting passages; a machine tool provided on the mounting means, the machine tool being fitted at one end portion thereof to the other end portion of the retaining means and having a friction stir welding portion at the other end portion thereof, wherein the mounting means is provided with a biasing means configured to exert a force on the retaining means in a direction from the other end portion toward the one end portion of the retaining means.

In accordance with the present invention, the machine tool can be pulled out without the plurality of mounting members coming off the tip end portions, even in the state where the machine tool adheres to the materials after the friction stir welding. In other words, when the machine tool is pulled out from the materials after the friction stir welding, the machine tool does not come off the retaining means. As a result, the friction stir welding is carried out continuously.

In the present invention, since the retaining means and the machine tool are fitted to each other, relative displacement between the retaining means and the machine tool does not occur when the retaining means causes the machine tool to be pressed against the materials during the friction stir welding. For this reason, relative displacement between the biasing means and the retaining means does not occur and the force exerted by the biasing means on the retaining means does not change when the machine tool is pressed against the materials. Therefore, the pressing force exerted by the machine tool on the materials can be easily controlled at a desired value, without taking the force exerted by the biasing means into account.

In addition, since the biasing means is provided on the mounting means, the structure of the retaining means is simplified. Furthermore, the retaining means can be kept mounted to the friction stir welding apparatus body. This can omit the operation for mounting the retaining means to the friction stir welding apparatus when the machine tool is changed. Moreover, the mounting of the machine tool is accomplished by the operation for moving the plurality of mounting members from the opening ends of the mounting passages to the tip end portions of the mounting passages. Therefore, mounting of the machine tool is facilitated.

It is preferable that in the above invention, a fitting hole may be formed on the other end portion of the retaining means, the machine tool has a tie-in portion at one end portion thereof; and the tie-in portion may be fitted to the fitting hole. In accordance with such a configuration, the tie-in portion is fitted to the fitting hole to suppress positional difference in the direction perpendicular to the rotational axis so that joining at a desired position is achieved.

It is preferable that in the above invention, at least a part of the fitting hole of the retaining means may have a tapered portion formed around a rotational axis of the machine tool, and at least a part of the tie-in portion of the machine tool may have an axis alignment portion having a tapered shape which is formed around the rotational axis of the machine tool so as to conform to the fitting hole.

In accordance with the above configuration, by fitting the axis alignment portion of the tie-in portion to the tapered portion of the fitting hole, the axis alignment portion is easily inserted into the tapered portion and the axis of the machine tool and the axis of the retaining means are aligned with each other. This make it possible that the machine tool is pressed at a desired position and rotated thereat and thus a difference between the desired position and an actual joint position is lessened. In addition, the load exerted in the rotational axis direction can be received by the entire surface.

It is preferable that in the above invention, at least a part of the fitting hole of the retaining means may have a non-circular portion formed in a non-circular shape as viewed from the rotational axis direction, and at least a part of the tie-in portion of the machine tool may have a rotation inhibiting portion having a non-circular shape so as to conform to a non-circular portion of the fitting hole.

In accordance with the above configuration, the rotation inhibiting portion of the tie-in portion is fitted to the non-circular portion of the fitting hole. This makes it possible to transmit the rotational force from the retaining means to the machine tool via the rotation inhibiting portion without sliding between the retaining means and the machine tool. In the second related art, the rotational force of the robot hand is exerted on the grip via the rollers when the grip is rotated with respect to the robot hand. For this reason, a large load is exerted on the rollers. In contrast, in the present invention, the rotational force of the retaining means can be received by the rotation inhibiting portion, and therefore, a large load is not exerted on the mounting members. This can prevent damage to the mounting members. In addition, since the retaining means and the machine tool do not slide relative to each other, the rotational force can be transmitted from the retaining means to the machine tool surely relative to each other. Thus, since it is not necessary that the friction stir welding apparatus body exerts an excess rotational force on the retaining means on assumption that the retaining means and the machine tool slide relative to each other, the output of the friction stir welding apparatus body can be reduced.

It is preferable that in the above invention, the plurality of mounting passages may be formed to have a hook shape and have a rotation guide groove which is connected to the opening ends and the tip end portions and extends in the circumferential direction; and the rotation guide groove of adjacent mounting passages may extend continuously.

In accordance with the above configuration, when moving the mounting members from the opening ends of the mounting passages to the tip end portions of the mounting passages, the mounting members are inserted into the opening ends and are moved to the rotation guide groove, and then the retaining means is rotated to cause the mounting members to move within the rotation guide groove. Thereafter, the mounting members are fitted into the tip end portions. Since the rotation guide groove of adjacent mounting passages extends continuously, the mounting members do not collide against the rotation guide grooves even if the retaining means is rotated to an excess degree.

A friction stir welding system of the present invention comprises the friction stir welding apparatus of the above invention; a controller configured to control rotation and movement of the retaining means; and a machine tool changer configured to mount the mounting means into which the machine tool is inserted; wherein the mounting means is mounted to the machine tool changer such that the mounting means is unable to rotate around a rotational axis of the machine tool.

In accordance with the above configuration, the retaining means is disposed at the side of the mounting means mounted to the machine tool changer with the machine tool inserted into the mounting means. Then, the controller causes the retaining means to move toward the mounting means, causing the tie-in portion of the machine tool to be fitted to the fitting hole of the retaining means and the mounting members to be inserted into the opening ends of the mounting passages. Then, the controller causes the retaining means to move and rotate. At this time, since the mounting means is mounted to the changer such that the mounting means is unable to rotate around the rotational axis, it is possible to prevent the retaining means and the mounting means from being rotated together but to rotate only the retaining means. This enables the plurality of mounting members to be moved to the tip end portions of the mounting passages. Thus, the mounting means can be mounted to the retaining means. With such a method, automatic mounting of the machine tool is accomplished by using the changer. By performing the operation which is the reverse of the above method, automatic detachment of the machine tool is accomplished. Thus, by using the changer, automatic mounting and automatic detachment, namely, automatic change of the machine tool are attained by using the changer.

It is preferred that in the above invention, the machine tool changer may include a base; a mounting platform which is configured to mount the mounting means; a support means which is provided at one end portion thereof with the base and at the other end portion thereof with the mounting platform which is movable close to and away from the base; a mounting platform biasing means configured to exert a force on the mounting platform in a direction away from the base; and a detecting means configured to detect whether or not a displacement of the mounting platform in a direction closer to the base is beyond a predetermined allowable range; and the controller may be configured to stop movement of the retaining means according to a detection result of the detecting means.

In accordance with the above configuration, even if a large load toward the base is exerted on the mounting platform in a case where the mounting means mounted to the changer is mounted to the retaining means, the load can be absorbed by the biasing means by displacing the mounting platform closer to the base.

In the present invention, the detecting means detects that the displacement of the mounting platform is beyond the predetermined allowable range. According to a detection result, the controller stops movement of the retaining means. This makes it possible to prevent that a large load is exerted on the mounting platform, the mounting means, and the retaining means when automatically changing the machine tool.

DETAILED DESCRIPTION OF THE PREFERRED INVENTION

Figure 1:
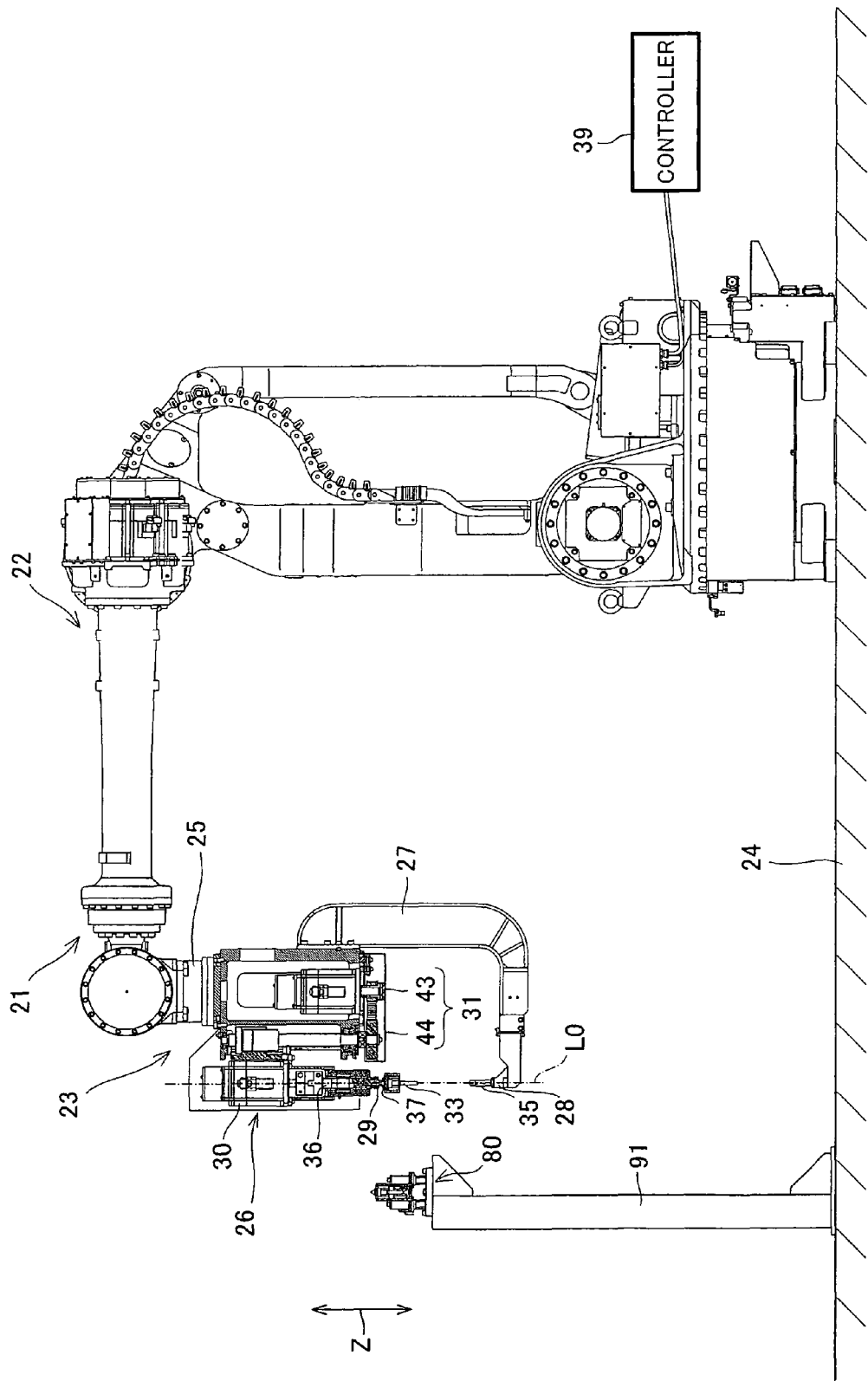
FIG. 1 is a front view showing a friction stir welding system according to an embodiment of the present invention.

FIG. 1 is a front view showing a friction stir welding system 21 according to an embodiment of the present invention. The friction stir welding system 21 comprises a robot 22, a friction stir welding gun 23 provided at a tip end portion 25 of the robot 22, and a tool changer 80.

The robot 22 is a multiaxial robot which is also referred to as a versatile robot. In this embodiment, the robot 22 is a six-axes robot and is installed on an installation object 24 such as a floor of a factory. The robot 22 is capable of displacing the tip end portion 25 in three axes directions which are perpendicular to each other and of angularly displacing the tip end portion 25 around the three axes which are perpendicular to each other. The friction stir welding gun 23 (hereinafter referred to as "FSW gun") is provided at the tip end portion 25 of the robot 22. Therefore, the robot 22 is capable of displacing the friction stir welding gun 23 in the three axes directions which are perpendicular to each other and of angularly displacing the friction stir welding gun 23 around the three axes which are perpendicular to each other. A controller 39 controls the displacement of the robot 22 thus configured in the three-axes directions perpendicular to each other and the angular displacement of the robot 22 around the three axes perpendicular to each other.

The FSW gun 23 which is a friction stir welding apparatus is an apparatus used for friction stir welding of a plurality of materials. The FSW gun 23 is an apparatus in which a rotational tool 33 which is a machine tool is adapted to contact at least one of the plurality of materials and to rotate at a high speed to soften and fluidize portions of the materials, thereby joining the plurality of materials. The FSW gun 23 includes a FSW gun body 26, a rotational tool retaining member unit 37, and a rotational tool unit 34 (see FIG. 2) having the rotational tool 33. The FSW gun body 26 includes a support frame 27, a fixed tool retaining member unit 28, a rotational tool mounting member unit 29, a rotation driving means 30, and a slide driving means 31.

The support frame 27 is substantially C-shaped. The support frame 27 is fixed to the tip end portion 25 of the robot 22 by a gun adapter 32. The fixed tool retaining member unit 28 is provided at one end portion of the support frame 27 which is farther from a portion of the support frame 27 which is fixed to the robot 22. The fixed tool retaining member unit 28 is fixed to the support frame 27 and is configured to retain the fixed tool 35 such that the fixed tool 35 is detachably attached thereto. The fixed tool 35 is disposed such that its axis conforms to a predetermined reference axis L0 and fixed such that relative displacement of the fixed tool 35 with respect to the support frame 27 is inhibited, in a state where the fixed tool 35 is retained by the fixed tool retaining member unit 28.

The rotational tool mounting member unit 29 is provided at the other end portion of the support frame 27 which is closer to a portion of the support frame 27 which is fixed to the robot 22 such that the rotational tool mounting member unit 29 is opposite to the fixed tool retaining member unit 28. The rotational tool mounting member unit 29 has a rotary base 40 for retaining the rotational tool retaining member unit 37. The rotational tool retaining member unit 37 is capable of retaining the rotational tool unit 34. Therefore, by retaining the rotational tool retaining member unit 37 for retaining the rotational tool unit 34 by the rotary base 40, the rotational tool unit 34 can be mounted to the rotational tool mounting member unit 29.

The support frame 27 is provided with a drive shaft 36. The rotary base 40 is fixed to one end portion of the drive shaft 36. The drive shaft 36 is rotatable around the reference axis L0 which is a rotational axis and is slidable along the reference axis L0, with its axis conforming to the reference axis L0. It should be noted that a direction parallel to the reference axis L0 is a rotational axis direction Z. According to the rotation and displacement of the drive shaft 36, the rotary base 40 rotates around the reference axis L0 and displaces in the rotational axis direction Z. The rotational tool retaining member unit 37 is retained by the rotary base 40. The rotational tool retaining member unit 37 is disposed such that the axis of the rotational tool 33 of the rotational tool unit 34 retained therein conforms to the reference axis L0. In this state, by rotating the drive shaft 36, the rotational tool 33 rotates around the reference axis L0 which is the rotational axis, while by displacing the drive shaft 36, the rotational tool 33 displaces in the rotational axis direction Z.

The rotation driving means 30 includes a rotation driving source 41 which is realized by a servo motor, and a rotation transmission mechanism 42 for transmitting a driving force from the rotation driving source 41 to the drive shaft 36. The rotation driving means 30 causes the rotation transmission mechanism 42 to transmit a rotation driving force output from the rotation driving source 41 to the drive shaft 36 to cause the drive shaft 36 to rotate around the reference axis L0. Thereby, the rotational tool unit 34 attached to the rotary base 40 via the rotational tool retaining member unit 37 rotates around the reference axis L0.

The slide driving means 31 includes a slide driving source 43 which is realized by a servo motor, and a slide transmission mechanism 44 for transmitting a driving force from the slide driving source 43 to the drive shaft 36. The slide driving means 31 causes the slide transmission mechanism 44 to convert the rotational driving force output from the slide driving source 43 into a sliding driving force in the rotational axis direction Z and transmits the sliding driving force to the drive shaft 36. This causes the driving shaft 36 to slide in the rotational axis direction Z. According to the sliding of the drive shaft 36, the rotational tool unit 34 mounted to the rotary base 40 via the rotational tool retaining member unit 37 displaces in the rotational axis direction Z. The rotation driving means 30 and the slide driving means 31 are electrically connected to a controller 39 along with the robot 22, and are controlled by the controller 33. Thus, the controller 39 is configured to control the rotation and movement of the rotational tool retaining member unit 37 and to control the rotation and movement of the rotational tool 33.

In the FSW gun 23 configured as described above, the slide driving means 31 causes the rotational tool 33 to displace toward the fixed tool 35 while the rotation driving means 30 is rotating the rotational tool 33. The rotational tool 33 is pressed against a joint region of the materials, with a load of about 600 kgf, so that portions of the materials corresponding to the joint region is softened, fluidized and joined. The joint region is changeable by driving the robot 22 to displace and angularly displace the FSW gun 23 attached at the tip end of the robot 22.

The tool changer 80 is a device used for removably mounting the rotational tool 33 to the FSW gun body 26. The tool changer 80 cooperates with the FSW gun body 26 to attain automatic change of the rotational tool 33. The tool changer 80 is installed on the installation object 24 on which the robot 24 is installed.

Figure 2:
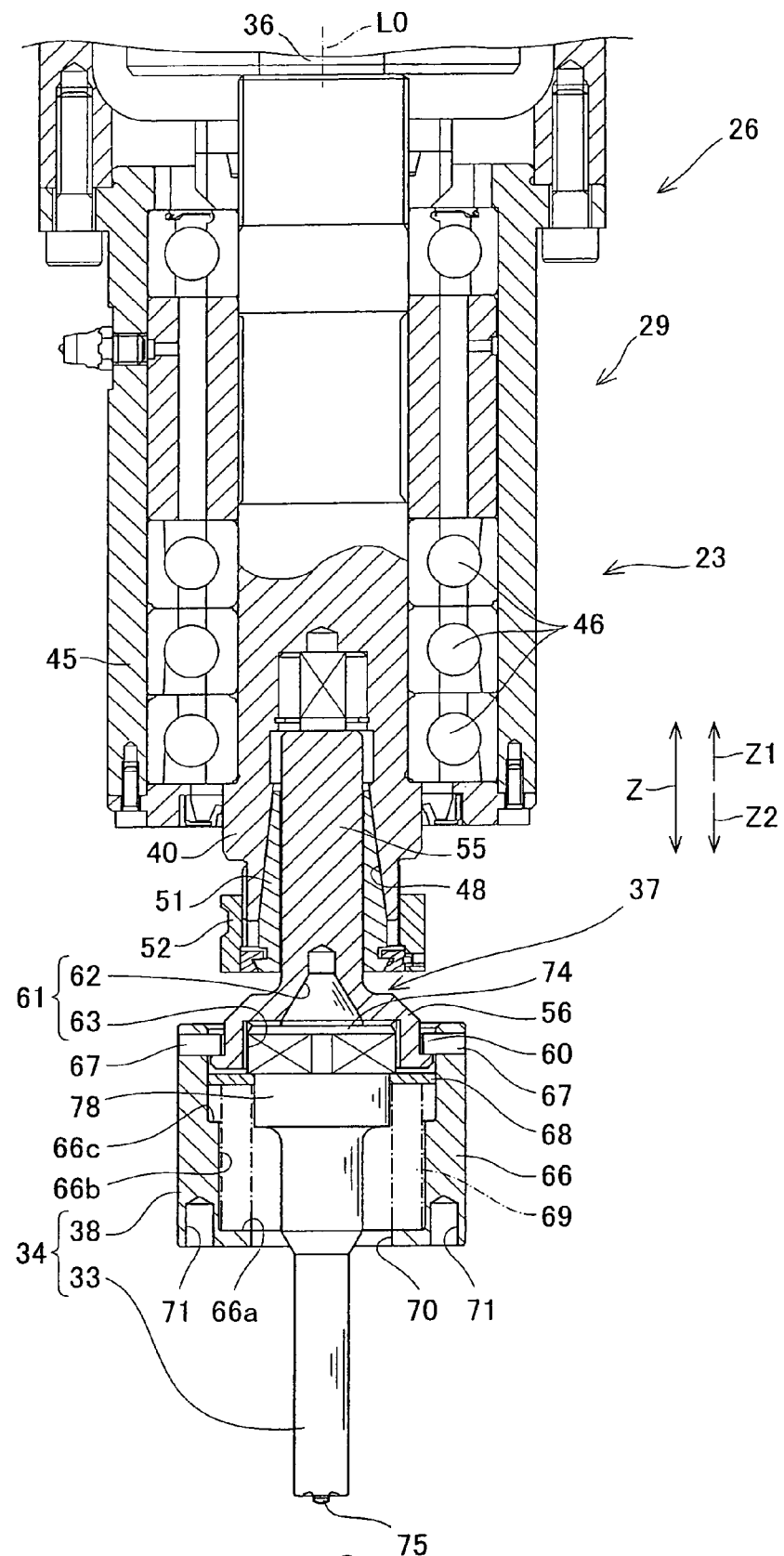
FIG. 2 is a cross-sectional view showing a state where a rotational tool unit is mounted to a rotational tool mounting member unit of a FSW gun.

FIG. 2 is a cross-sectional view showing a state where the rotational tool unit 34 is mounted to the rotational tool mounting member unit 29 of the FSW gun 23. The rotational tool mounting member unit 29 is configured to include a support base 45, a rotary base 40, a chuck member 51, and an operation member 52. The support base 45 is supported by the support frame 27 (see FIG. 1) such that the support base 45 is slidable in the rotational axis direction Z. A bearing means 46 which is realized by a ball bearing is accommodated inside the support base 45. The rotary base 40 whose axis conforms to the reference axis L0 is partially fitted into the bearing means 46. Because of this, the rotary base 40 is retained by the support base 45 such that the rotary base 40 is rotatable around the reference axis L0. The rotary base 40 is provided on the support base 45 such that sliding of the rotary base 40 in the rotational axis direction Z is inhibited, and is coupled to the drive shaft 36 by a coupling portion 47 provided at one end portion in the rotational axis direction which is an end portion of the drive shaft 36 side.

The rotary base 40 is provided with a bottomed tubular mounting hole 48 at the other end portion in the rotational axis direction which is the end portion on the fixed tool retaining member unit 28 side such that the mounting hole 48 opens toward the fixed tool retaining member unit 28. The mounting hole 48 has a tapered inner peripheral surface whose diameter decreases in a direction away from an opening end, and the chuck member 51 is fitted to the tapered inner peripheral, surface.

The chuck member 51 is cylindrical. The chuck member 51 has a tapered outer peripheral surface having a diameter decreasing from one end in the rotational axis direction toward the other end in the rotational axis direction. The outer peripheral surface substantially conforms in shape to the inner peripheral surface of the mounting hole 48. The operation member 52 is removably coupled to one end portion of the chuck member 51. The operation member 52 is threadedly engaged with the opening end portion of the rotary base 40. The operation member 52 is rotated to displace in one rotational axis direction Z1. By rotating the operation member 52 to cause the operation member 52 to displace in the one rotational axis direction Z1, the chuck member 51 relatively displaces in the one rotational axis direction Z1 with respect to the rotary base 40. This causes the chuck member 51 to be tightened. The chuck member 51 is configured to allow one end portion of the rotational tool retaining member unit 37 to be inserted thereinto. By tightening the chuck member 51 with the rotational tool retaining member unit 37 inserted thereinto, the rotational tool retaining member unit 37 is tightened and retained by the chuck member 51. As used herein, the term "one rotational axis direction Z1" refers to a direction from the rotational tool retaining member unit 37 toward the drive shaft 36, and is an upward direction in FIG. 2, while the other rotational axis direction Z2 is a direction opposite to the one rotational axis direction Z1.

Figure 3:
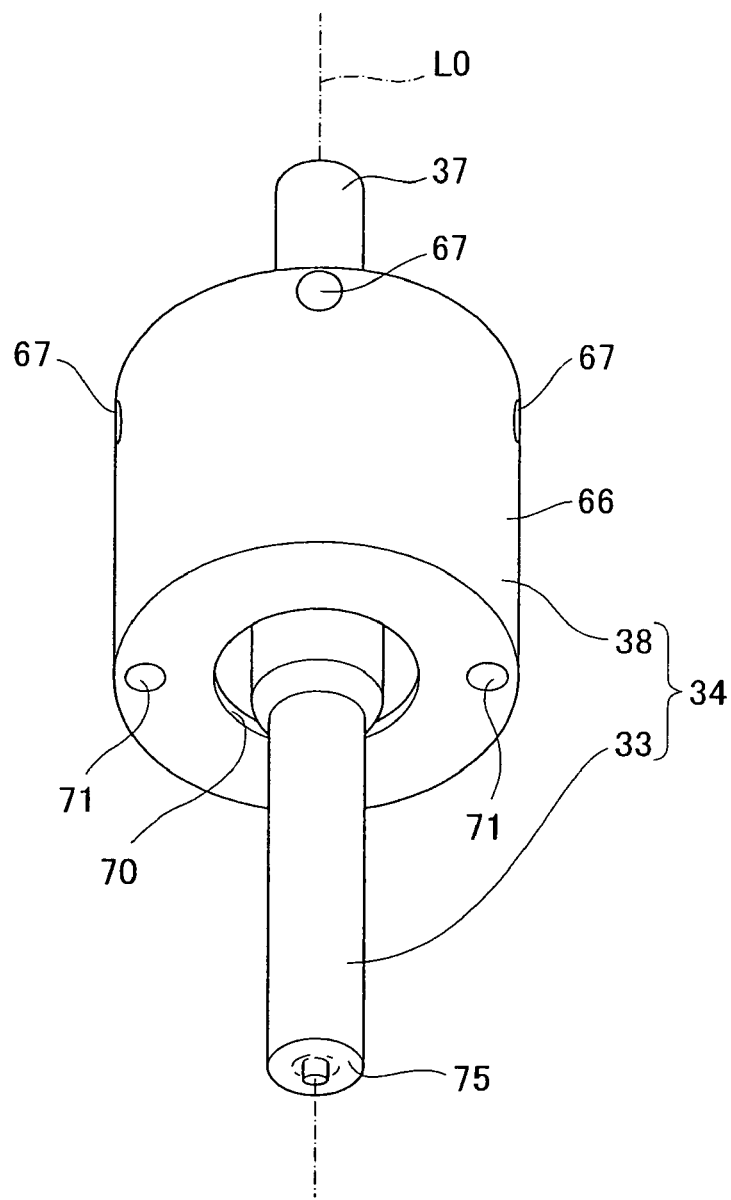
FIG. 3 is a perspective view showing a state where the rotational tool unit is mounted to a rotational tool retaining member unit.
Figure 4:
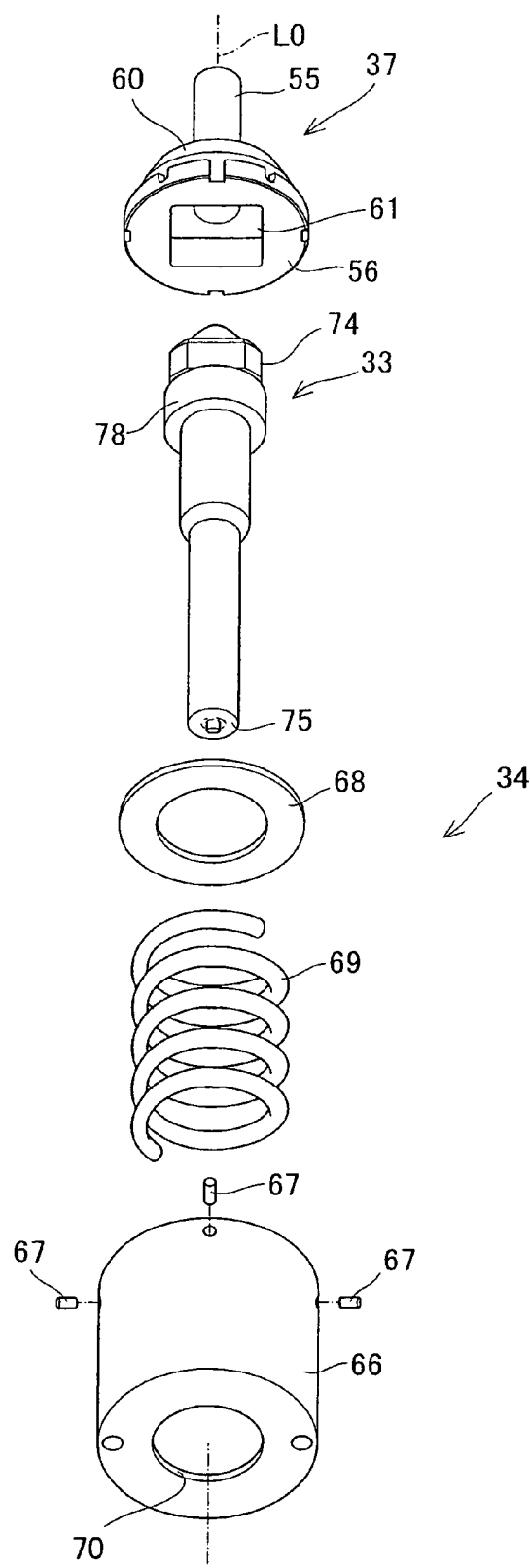
FIG. 4 is an exploded perspective view of the rotational tool retaining member unit and the rotational tool unit.

FIG. 3 is a perspective view showing a state where the rotational tool unit 34 is mounted to the rotational tool retaining member unit 37. FIG. 4 is an exploded perspective view of the rotational tool retaining member unit 37 and the rotational tool unit 34. The rotational tool unit 34 is mounted at the other end portion in the rotational axis direction of the rotational tool retaining member unit 37. The rotational tool retaining member unit 37 is configured to retain the rotational tool unit 34 such that the rotational tool unit 34 is removably mounted to the FSW gun body 26.

Figure 5:
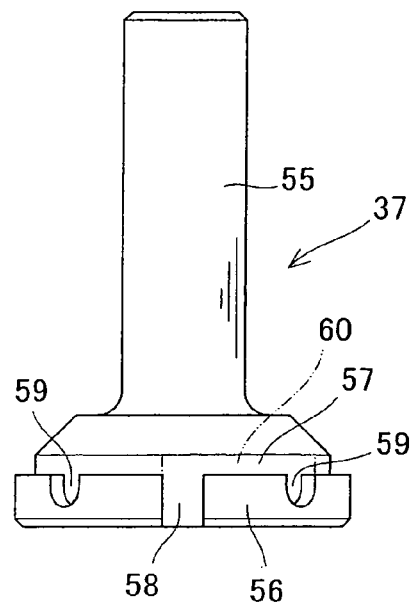
FIG. 5 is an enlarged side view showing the rotational tool retaining member unit.
Figure 6:
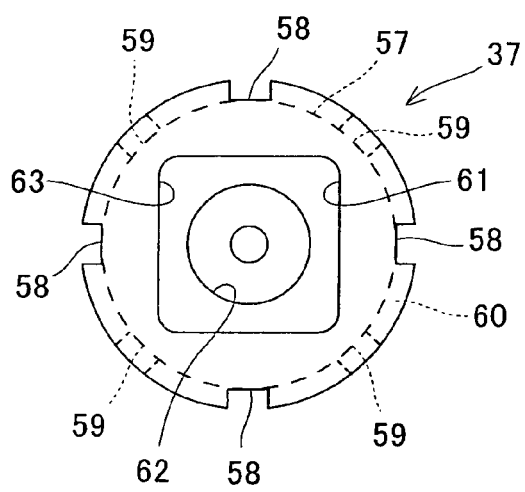
FIG. 6 is an enlarged bottom view showing the rotational tool retaining member unit.

FIG. 5 is an enlarged side view showing the rotational tool retaining member unit 37. FIG. 6 is an enlarged bottom view showing the rotational tool retaining member unit 37. Hereinafter, description will be given with reference to these figures and FIG. 2. The rotational tool retaining member unit 37 which is a retaining means includes a shaft portion 55 and a mounting portion 56. The shaft portion 55 is formed to be of a cylindrical shape so that the shaft portion 55 is insertable into the chuck member 51 and mountable to the chuck member 51. The mounting portion 56 is integrally provided at one axial end portion of the mounting member 55.

The mounting portion 56 is formed to have a disc shape whose diameter is larger than that of the mounting member 55. The axis of the mounting portion 56 conforms to the axis of the shaft portion 55. The mounting portion 56 has an outer peripheral portion in which one axial end portion which is the end portion on the shaft portion 55 side is cut in the axial direction over the entire circumference. Thereby, on the outer peripheral portion of the mounting portion 56, a rotation guide groove 57 is formed to extend over the entire circumference thereof. In addition, on the outer peripheral portion of the mounting portion 56, a plurality of insertion grooves 58 are formed to be equally spaced apart from each other in the circumference direction. Engagement recesses 59 are each provided between associated insertion grooves 58. In this embodiment, four insertion grooves 58 and four engagement recesses 59 are formed at intervals of 90 degrees in the circumferential direction on the outer peripheral portion of the mounting portion 56. The insertion groove 58 and the engagement recess 58 which are located adjacent are spaced apart from each other at an angle of 45 degrees in the circumferential direction. The intervals are not limited to these values.

The insertion groove 58 penetrates from one axial end of the mounting portion 56 to the other axial end of the mounting portion 56. Therefore, the insertion groove 58 is configured such that one end thereof is connected to the rotation guide groove 57 and the other axial end opens on the opposite side of the rotation guide groove 57. The engagement recess 59 is configured such that one end thereof is connected to the rotation guide groove 57 and extends therefrom to an intermediate axial portion of the mounting portion 56. Therefore, the other end portion of the engagement recess 59 is closed. The rotation guide groove 57, the insertion grooves 58, and the engagement recesses 59 which are formed as described above are configured such that the insertion groove 58 and the engagement recess 59 which are located adjacent, and a region of the rotation guide groove 57 which is sandwiched between the insertion groove 58 and the engagement recess 59 define a hook-shaped mounting passage 60.

A fitting hole 61 is provided on the other axial end portion of the rotation tool retaining member 27 which is an end portion on the mounting portion 56 side such that the fitting hole 61 is formed around the axis thereof. The fitting hole 61 extends from the one end portion to the shaft portion 55. The shape of the fitting hole 61 is different between the one end side and the other end side of the rotational tool retaining member unit 37. The fitting hole 61 has a tapered shape having a diameter decreasing toward one end of the rotational tool retaining member unit 37 at the one end side of the rotation tool retaining member unit 37, and has a non-circular shape, in this embodiment, square shape at the other end side of the rotational tool retaining member unit 37. In other words, the fitting hole 61 has a tapered portion 62 at the one end side and a square portion 63 which is a non-circular portion at the other end side. The non-circular shape of the other end side may be, for example, an oval, a rectangular, or a star.

In the rotational tool retaining member unit 37 configured as described above, a part of the shaft portion 55 is inserted into the chuck member 51. Then, the operation member 52 rotates and displaces in the one rotational axis direction Z1, causing the shaft portion 55 to be tightened with respect to the chuck member 51. In this manner, one end portion of the rotational tool retaining member unit 37 is retained by and mounted to the FSW gun body 26. At this time, the rotational tool retaining member unit 37 is mounted to the rotational tool mounting member unit 29 such that the axis of the shaft portion 55 conforms to the reference axis L0. Thereby, the axis of the rotational tool retaining member unit 37 and the axis of the rotational tool mounting member unit 29 conform to the reference axis L0. The rotational tool unit 34 is mounted to the other end portion of the rotational tool retaining member unit 37 mounted as described above, i.e., the mounting portion 56.

Figure 7:
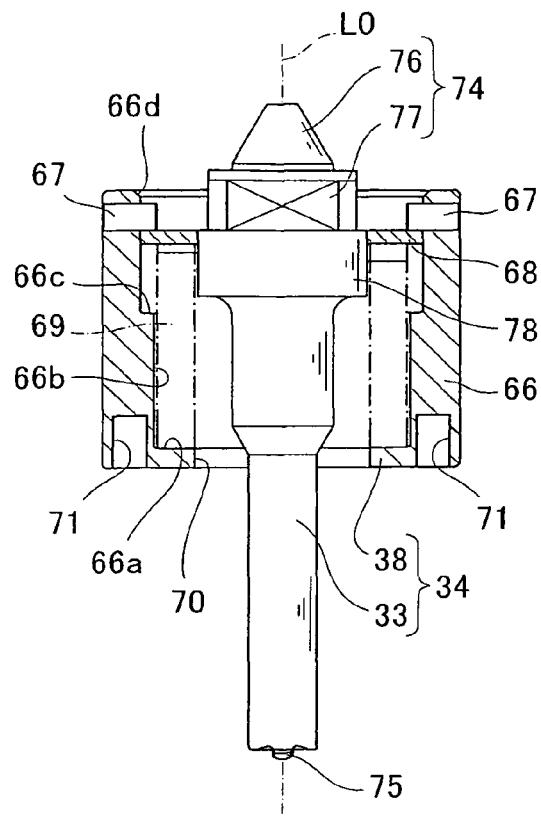
FIG. 7 is an enlarged cross-sectional view showing the rotational tool unit.
Figure 8:
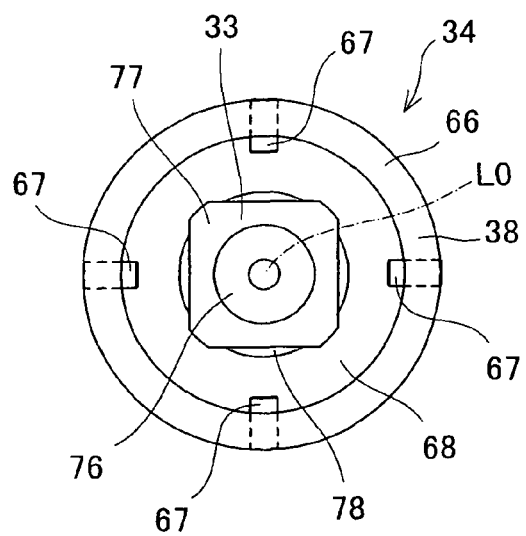
FIG. 8 is an enlarged plan view showing the rotational tool unit.

FIG. 7 is an enlarged cross-sectional view showing the rotational tool unit 34. FIG. 8 is an enlarged plan view showing the rotational tool unit 34. Hereinafter, description will be given with reference to these figures and FIGS. 2 to 4. The rotational tool unit 34 includes a mounting member unit 38 and a rotational tool 33. The mounting member unit 38 which is a mounting means includes a casing 66, a plurality of pin members 67, and a spring receiver 68, and a biasing member 69. The casing 66 has a bottomed cylinder shape. An insertion hole 70 is formed on a bottom portion 66a of the casing 66 to penetrate therethrough in the axial direction of the casing 66. A plurality of positioning holes 71 are formed on a peripheral region of the bottom portion 66a of the casing 66 such that they extend thereinto in the axial direction and are equally spaced apart from each other in the circumferential direction. A portion of an inner peripheral surface 66b of the casing 66 which is located at the bottom portion side protrudes radially inward. Thereby, a step portion 66c is formed on the inner peripheral surface 66b of the casing 66. A plurality of pin members 67 are provided at an opening end portion of the casing 66 to be equally spaced apart from each other in the circumferential direction.

The plurality of pin members 67, which are mounting members, are stepped parallel pins in this embodiment. The plurality of pin members 67 radially inwardly penetrate from the outer peripheral portion of the casing 66 and their tip ends protrude from the inner peripheral surface 66b of the casing 66. The plurality of pin members 67 are provided to respectively correspond to the insertion grooves 58 of the rotational tool retaining member unit 37. In this embodiment, therefore, four pin members 67 are provided at intervals of 90 degrees in the circumferential direction.

Inside the casing 66, a spring receiver 68 is provided between the step portion 66c and the plurality of pin members 67. The spring receiver 68 is a disc plate formed in an annular shape. The spring receiver 68 is formed such that the spring receiver 68 is slidable between the step portion 66c of the casing 66 and the plurality of pin members 67. The plurality of pin members 67 serves to inhibit the spring receiver 68 from coming off the casing 66 and from sliding from the step portion 66c toward the bottom portion. The biasing member 69 which is a biasing means is interposed between the spring receiver 68 and the bottom portion 66a of the casing 66. The biasing member 69 is, for example, a compressive spring, and its spring constant is not smaller than 10N/mm and not larger than 60N/mm. The biasing member 69 has an inner diameter larger than an inner diameter of the spring receiver 68 and a diameter of the insertion hole 70, and is configured to exert a force on the spring receiver 68. The rotational tool 33 is inserted into the mounting member unit 38 structured as described above.

The rotational tool 33 has a substantially cylindrical shape. A tie-in portion 74 is formed at one axial end portion of the rotational tool 33, a friction stir welding portion 75 is formed at the other axial end portion, and a positioning portion 78 is formed at an intermediate axial portion. The tie-in portion 74 is formed to be capable of being fitted into the fitting hole 61 of the rotational tool retaining member unit 37 and to conform in shape to the fitting hole 61. That is, the shape of the tie-in portion 74 is different between the tip end side of one axial end portion of the rotational tool 33 and the other axial end portion side of the rotational tool 33.

More specifically, the portion of the tip end side of the one axial end portion of the tie-in portion 74 has a tapered shape whose diameter decreases toward the tip end, while the portion of the other axial end side has a non-circular shape, square shape in this embodiment. Thereby, the tie-in portion 74 has an axis alignment portion 76 of a tapered shape at the tip end side, and a rotation inhibiting portion 77 of a square shape at the other end portion side. The outer shape of the axis alignment portion 76 and the outer shape of the rotation inhibiting portion 77 are substantially the same as the inner shape of the tapered portion 62 of the fitting hole 61 and the inner shape of the square portion 63 of the fitting hole 61. Because of this, when the tie-in portion 74 is fitted to the fitting hole 61, the axis alignment portion 76 aligns the axis of the rotational tool 3 with the axis of the rotational tool retaining member unit 37 and the rotation inhibiting portion 77 inhibits the rotational tool 33 from rotating with respect to the rotational tool retaining member unit 37. The non-circular shape of the rotation inhibiting portion 77 may be an oval, a rectangle, or a star. As the non-circular shape of the rotation inhibiting portion 77, a shape for inhibiting the rotation of the rotational tool 33 in the state where the rotation inhibiting portion 77 is fitted to the fitting hole 61 will suffice. In addition, the rotation inhibiting portion 77 has a diagonal line which is longer than at least the inner diameter of the spring receiver 68 of the mounting member unit 38. Therefore, when the rotational tool 33 is inserted into the mounting member unit 38, the rotation inhibiting portion 77 is mounted to the spring receiver 68 and the spring receiver 68 supports the rotational tool 33 (see FIG. 7).

The friction stir welding portion 75 is configured to rotate at a high speed while contacting the joint region of the materials, thereby performing friction stir welding of the two materials. The positioning portion 78 is provided integrally with the rotation inhibiting portion 77 of the tie-in portion 74. The outer diameter of the positioning portion 78 is substantially identical to the inner diameter of the spring receiver 68. Therefore, by inserting the positioning portion 78 into the spring receiver 68, the rotational tool 33 is radially positioned with respect to the mounting member unit 38.

In the rotational tool unit 34 having the above structure, the rotational tool 33 is inserted into the inner hole of the spring receiver 68, the biasing member 69 and the insertion hole 70 of the mounting member unit 38, and is pressed to an extent that the rotation inhibiting portion 77 of the rotational tool 33 is mounted to the spring receiver 68. By mounting the rotation inhibiting portion 77 of the rotational tool 33 to the spring receiver 68, the rotational tool 33 is positioned by the positioning portion 78 with respect to the mounting member unit 38, thus configuring the rotational tool unit 34.

Then, the rotational tool unit 34 configured as described above is mounted to the rotational tool retaining member unit 37. To be specific, first, the mounting portion 56 of the rotational tool retaining member unit 37 is inserted into the opening of the mounting member unit 38, i.e., the opening 66d of the casing 66. At this time, the mounting portion 56 is inserted after the rotational tool unit 34 and the rotational tool retaining member unit 37 are disposed in a position where the outer shape of the fitting hole 61 conforms to the outer shape of the tie-in portion 74 and the pin members 67 of the mounting member unit 38 respectively correspond to the insertion grooves 58 of the mounting portion 56 in a plan view (as viewed from the rotational axis direction). The rotational tool unit 34 and the rotational tool retaining member unit 37 may be disposed in that position in such a manner that only a part of the mounting portion 56 may be first inserted and then the rotational tool unit 34 is rotated or the like.

By inserting the rotational tool retaining member unit 37 into the mounting member unit 38, the tie-in portion 74 is fitted to the fitting hole 61, the other end portion of the rotational tool retaining member unit 37 and the one end portion of the rotational tool 33 are brought into contact with each other, and the pine members 67 are respectively inserted into the insertion grooves 58. At this time, the tapered portion 62 of the fitting hole 61 and the axis alignment portion 76 of the tine-in portion 74 aligns the axis of the rotational tool 33 with the axis of the rotational tool retaining member unit 37. There is a slight gap formed between the rotational tool retaining member unit 37 and the spring receiver 68, and the spring receiver 68 is in contact with the plurality of pine members 67.

In this state, the rotational tool retaining member unit 37 is further pressed in the other rotational axis direction Z2 which is the direction in which the rotational tool retaining member unit 37 is inserted, causing the rotation inhibiting portion 77 to press the spring receiver 68 to move it in the other rotational axis direction Z2. Thereby, the pin members 67 reach regions of the rotation guide groove 57 of the mounting passages 60. Then, by rotating the rotational tool retaining member unit 37 while retaining the mounting member unit 38, the pin members 67 move in the rotation guide groove 57 in the circumferential direction. Since the rotation guide groove 57 is formed to extend over the entire circumference, i.e., continuously, the pin members 67 will not collide against the rotation guide groove 57 even if the rotational tool retaining member unit 37 is rotated to a large degree.

After the pin members 67 reach the opening ends of the engagement recesses 59, the rotational tool retaining member 7 is returned in the one rotational axis direction Z1, causing the pin members 67 to be respectively fitted into the engagement recesses 59. Thus, the rotational tool unit 35 is mounted to the rotational tool retaining member unit 37.

In the state where the rotational tool unit 34 is mounted to the rotational tool retaining member unit 37 in the manner as described above, the pin members 67 are pressed against the engagement recesses 59 by the force exerted by the biasing member 69 and are inhibited from coming off the engagement recesses 59. That is, the rotational tool unit 34 is mounted to the rotational tool retaining member unit 37 in the state where the mounting member unit 38 is inhibited from coming off. In the state where the rotational tool unit 34 is mounted to the rotational tool retaining member unit 37 in the manner as described above, the tie-in portion 74 of the rotational tool 33 is fitted to the fitting hole 61 of the rotational tool retaining member unit 37 in the state where the tie-in portion 74 of the rotational tool 33 is subjected to the force exerted by the biasing member 69 via the spring receiver 68. Therefore, the rotational tool 33 is mounted to the rotational tool retaining member unit 37 such that the rotational tool 33 is sandwiched between the rotational tool retaining member unit 37 and the spring receiver 68. The axes of the rotational tool 33 and the mounting member unit 38 mounted in the manner described above conform to the reference axis L0.

By mounting the rotational tool unit 34 to the rotational tool retaining member unit in the manner described above, the rotational tool 33 can be pulled out from the materials without the plurality of pin members 67 coming off the tip end portions even though the rotational tool 33 adheres to the materials after the friction stir welding. This makes it possible to inhibit the plurality of pin members 67 from coming off the mounting passages 60. In other words, when the rotational tool 33 is pulled out from the materials after the friction stir welding, the rotational tool 33 is not detached from the rotational tool retaining member unit 37. Therefore, friction stir welding is carried out for different portions in succession.

In the FSW gun 23, during the friction stir welding, the rotational tool retaining member unit 37 presses the tie-in portion 74 of the rotational tool 33 which is fitted to the fitting hole 61 to cause the rotational tool 33 to be pressed against the materials. Thereby, during the pressing, relative displacement between the rotational tool retaining member unit 37 and the rotational tool 33 does not occur. As a matter of course, relative displacement between the rotational tool retaining member unit 37 and the mounting member unit 38 does not occur. For this reason, the force exerted by the biasing member 69 on the rotational tool retaining member unit 37 does not change when the rotational tool 33 is pressed against the materials. Therefore, it is not necessary to take the force exerted by the biasing member 69 into account when the pressing force exerted by the rotational tool 33 on the materials is controlled at a desired value. Thus, the pressing force can be easily controlled at the desired value. This advantage is achieved even if the other end portion of the rotational tool retaining member unit 37 and the one end portion of the rotational tool 33 are configured to have shapes conforming to each other and to contact each other.

By fitting the axis alignment portion 76 of the tie-in portion 74 to the tapered portion 62 of the fitting hole 61, the axis alignment portion 76 is easily inserted into the tapered portion 62, and the axis of the rotational tool 33 and the axis of the rotational tool retaining member unit 37 are aligned with each other. This makes it possible to rotate the rotational tool 33 at a desired position and lessen a difference between a desired position and an actual joint position. Furthermore, a load in the rotational axis direction Z is received by the entire surface.

The rotation inhibiting portion 77 of the tie-in portion 74 is fitted to the square portion 63 of the fitting hole 61. This makes it possible to transmit a rotational force from the rotational tool retaining member unit 37 to the rotational tool 33 via the rotation inhibiting portion 77 without sliding between the rotational tool retaining member unit 37 and the rotational tool 33. Since the rotation inhibiting portion 77 is capable of receiving the rotational force from the rotational tool retaining member unit 37, a large load is not exerted on the pin members 67. This prevents damage to the pin members. In addition, since the rotational tool retaining member unit 37 and the rotational tool 33 do not slide relative to each other, the rotational force can be surely transmitted from the rotational tool retaining member unit 37 to the rotational tool 33. Since it is not necessary that the FSW gun body 26 exerts an excess rotational force on the rotational tool retaining member unit 37 on assumption that the rotational tool retaining member unit 37 and the rotational tool 33 slide relative to each other, the output of the FSW gun body 26 can be reduced.

By providing the biasing member 69 on the mounting member unit 38, the structure of the rotational tool retaining member unit 37 is simplified. In addition, the rotational tool retaining member unit 37 which is complex in the mounting operation can be kept mounted to the FSW body 26. This omits the operation for mounting the rotational tool 33 to the rotational tool retaining member unit 37 when the rotational tool 33 is changed. Also, the mounting of the rotational tool 33 is accomplished by the operation for moving the plurality of pin members 67 of the mounting member unit 38 into which the rotational tool 33 is inserted from the opening ends to the engagement recesses 59 of the mounting passages 60. Thus, mounting of the rotational tool 33 is easy. For this reason, the rotational tool 33 can be mounted automatically by using a machine without an operator' manual operation. Hereinafter, a tool changer 80 used to removably mount the rotational tool 33 using the FSW gun 23 will be described.

Figure 9:
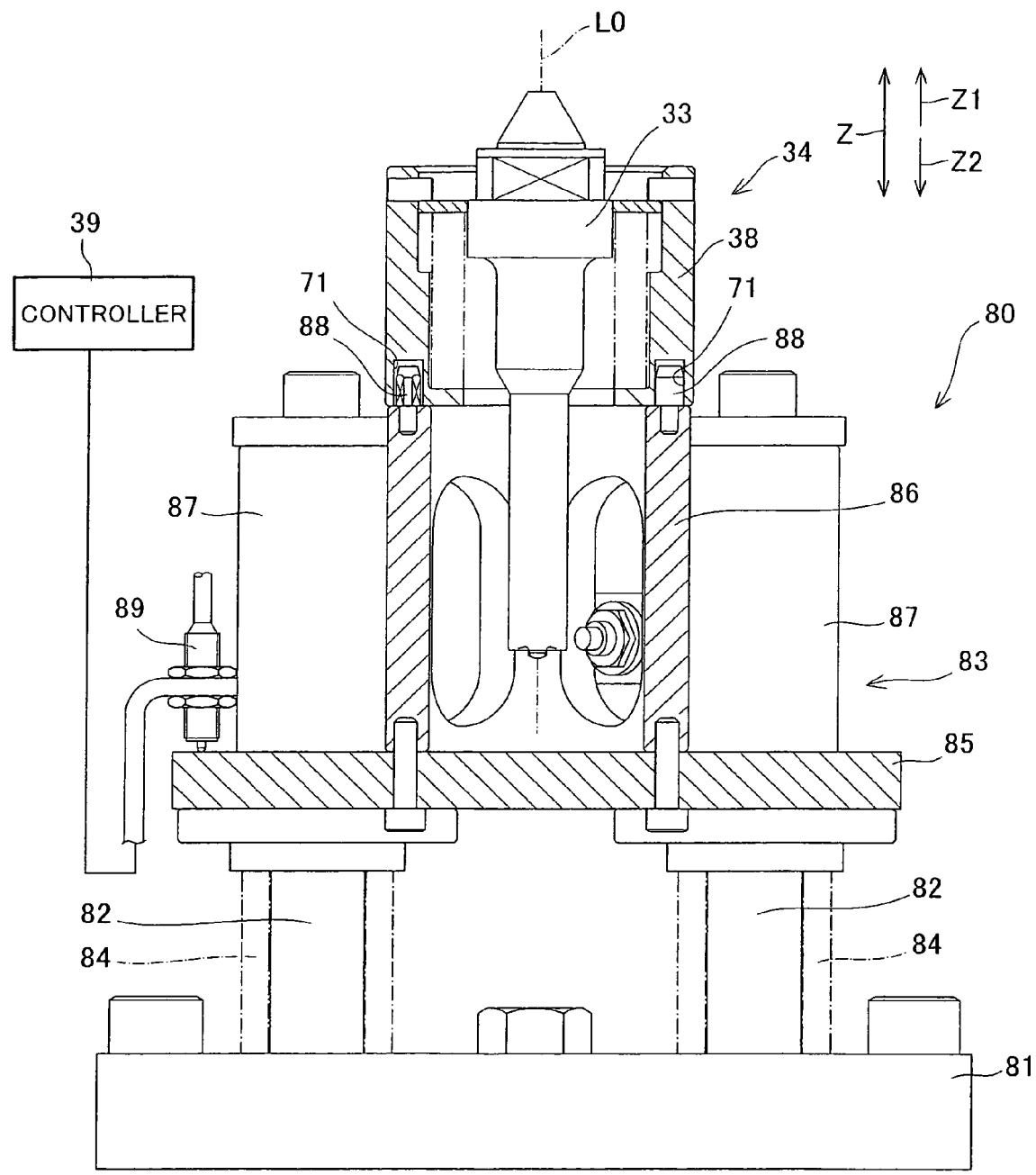
FIG. 9 is an enlarged cross-sectional view showing a tool changer 80.

FIG. 9 is an enlarged cross-sectional view showing the tool changer 80. The tool changer 80 which is a machine tool changer includes a base 81, a plurality of supports 82, a machine tool mounting platform 83, a spring member 84, and a limit switch 89. The base 81 is provided to extend vertically on the installation object 24. The plurality of supports 82 extend vertically on the upper end portion of the base 81. In this embodiment, three supports 82 are provided. The machine tool mounting platform 83 is provided on the three vertically extending supports 82 such that the machine tool mounting platform 83 is vertically slidable. The machine tool mounting platform 831 which is a mounting platform has a plate portion 85 of a plate shape and a cylindrical mounting portion 86. The three supports 82 penetrate through the plate portion 85, enabling the machine tool mounting platform 83 to vertically slide. Stopper members 87 are provided at upper end sides of the three supports 82, respectively to inhibit the plate portion 85 from coming off the supports 82. The mounting portion 86 is provided on the upper surface of the plate portion 85.

The mounting portion 86 is fixed at a lower end thereof to the plate portion 85. A plurality of positioning pins 88 are provided on a peripheral region of the upper end of the mounting portion 86 to be spaced apart from each other in the circumferential direction. The positioning pins 88 are provided to protrude upward from the peripheral region of the upper end of the mounting portion 86. The positioning pins 88 are provided to respectively correspond to the positioning holes 71 formed in the casing 66 of the mounting member unit 38. Between the machine tool mounting platform 83 and the base 81 configured as described above, spring members 84 are wound around the three supports 82, respectively. The spring members 84 are compressive coil springs. The spring members 84 are sandwiched between the base 81 and the machine tool mounting platform 83 in the state where the spring members 84 are wound around the three supports 82, respectively.

The machine tool mounting platform 82 configured as described above is positioned a predetermined distance apart from the base 81 under the upward force exerted by the spring members 84. In this structure, when the machine tool mounting platform 83 is pressed down, it moves down. This permits the above described pressing operation. Furthermore, the machine tool mounting platform 83 is provided with the limit switch 89 on assumption that the machine tool mounting platform 83 is pressed to an excess degree which is not permitted by the spring members 84. The limit switch 89 is electrically connected to the controller 39 and is configured to detect a vertical displacement of the machine tool mounting platform 83. The limit switch 89 is configured to detect that the machine tool mounting platform 83 has moved down beyond a predetermined allowable range and to output a detection result to the controller 39. According to the detection result, the controller 39 stops driving of the rotation driving means 30, the slide driving means 31, and the robot 22. This makes it possible to prevent that the rotational tool unit 34 is subjected to a large load that causes the machine tool mounting platform 83 to move down beyond the predetermined allowable range, when automatically mounting and removing the rotational tool unit 34.

Figure 10:
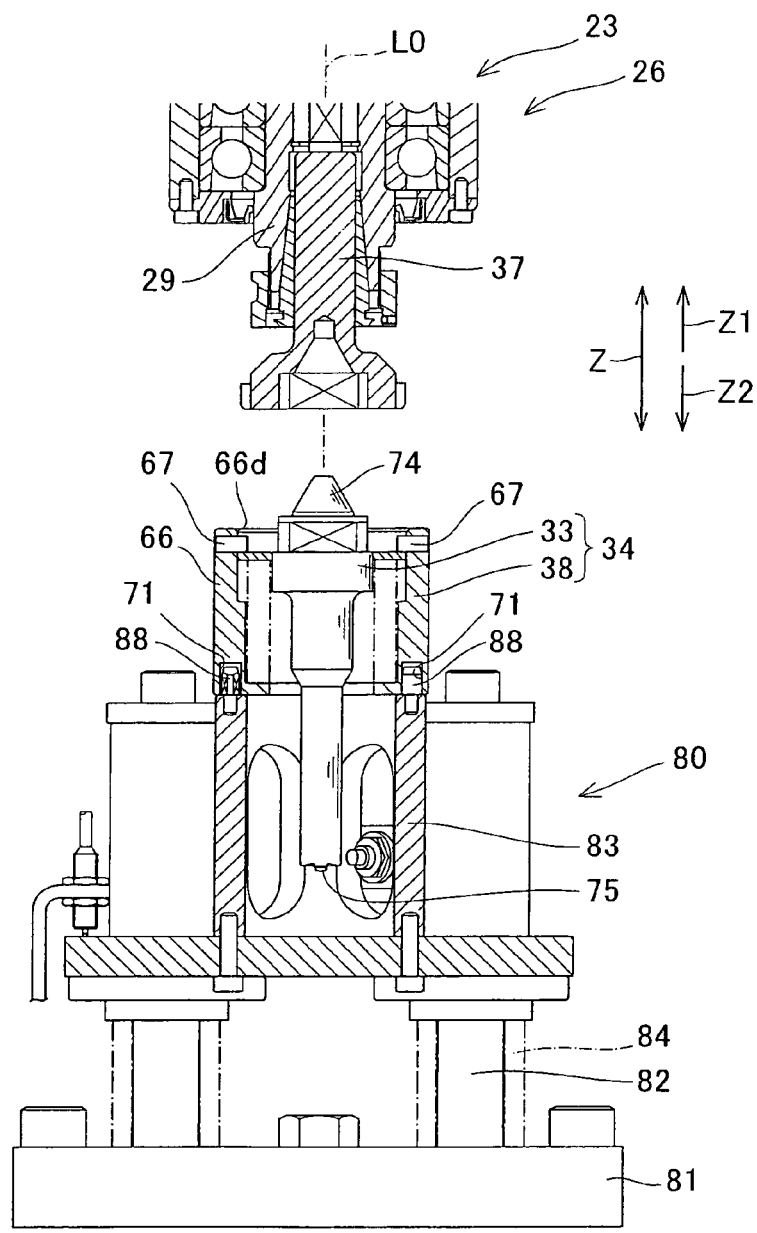
FIG. 10 is an enlarged cross-sectional view showing a state where the rotational tool mounting member unit is in a standby state above the tool changer, as being partly enlarged.

Hereinafter, a method of automatically changing the rotational tool unit 34 using the tool changer 80 will be described. Hereinafter, it is assumed that the rotational axis direction Z is substantially parallel to the vertical direction. FIG. 10 is an enlarged cross-sectional view showing the state where the rotational tool mounting member unit 29 is in a stand-by state above the tool changer 80, as being partly enlarged. The mounting member unit 38 is mounted to the machine tool mounting platform 83 of the tool changer 80 with the positioning pins 88 respectively fitted into the positioning holes 71. The rotational tool 33 is inserted into the mounting member unit 38 such that the friction stir welding portion 75 is located at a lower side. Thereby, a part of the tie-in portion 74 of the rotational tool 33 protrudes upward from the opening end 66d of the casing 66. As shown in FIG. 10, the FSW gun body 26 causes the rotational tool mounting member unit 29 to be in a stand-by state above the tool changer 80 with the rotational-tool retaining member unit 37 mounted to the rotational tool mounting member unit 29 (stand-by state). In the stand-by state, the rotational tool unit 34 and the rotational tool mounting member unit 29 are positioned so that the axis of the rotational tool 33 substantially conforms to the axis of the rotational tool retaining member unit 37 and the plurality of pin members 67 respectively correspond to the plurality of insertion grooves 58 as viewed from above. This positional relationship is attained by the fact that the controller 39 controls the robot 22.

Figure 11:
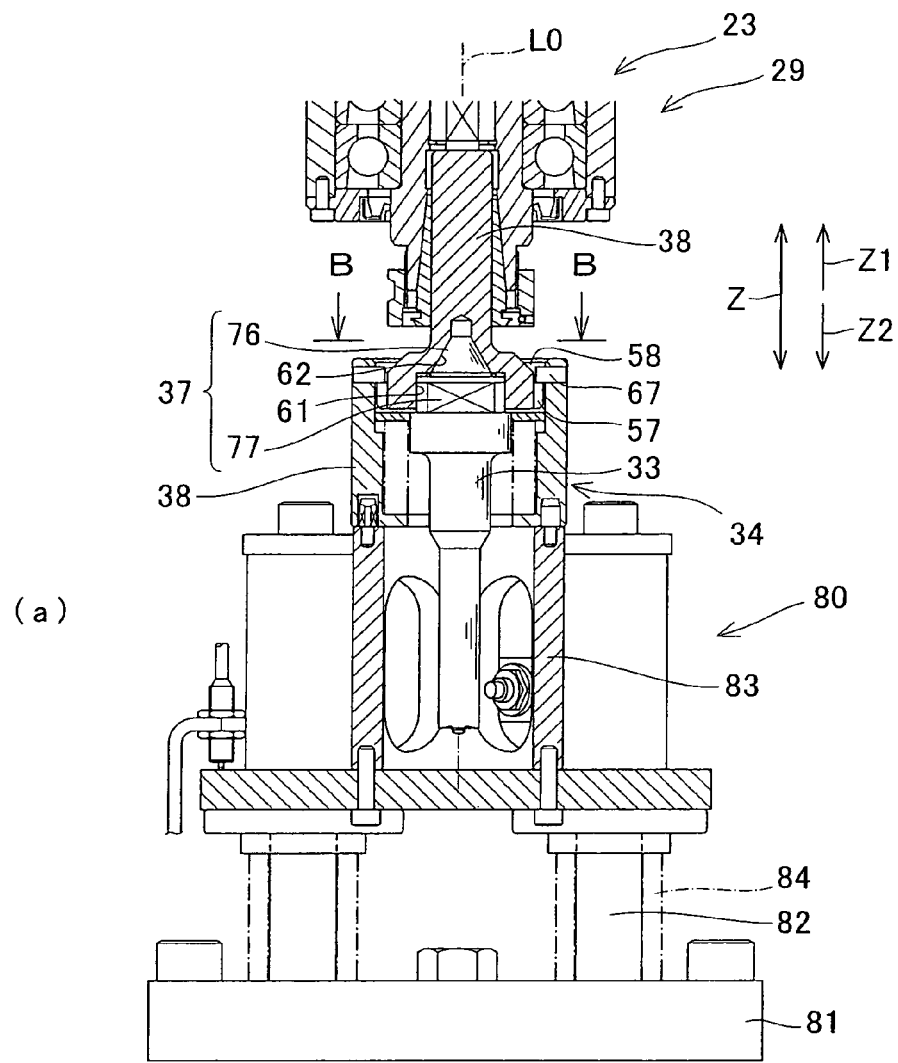
FIG. 11 is an enlarged cross-sectional view showing a state where the rotational tool mounting member unit is moved to a down position after the stand-by state of FIG. 10, as being partly enlarged.
Figure 11:
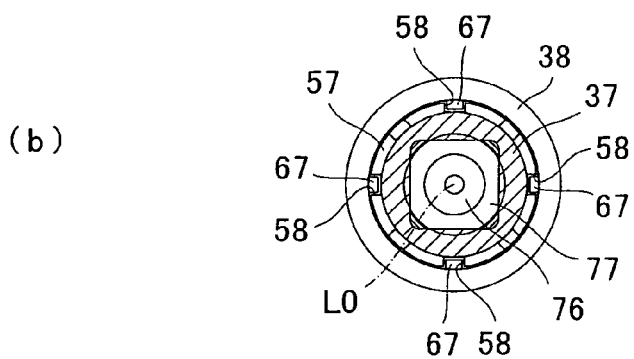

FIG. 11 is an enlarged cross-sectional view showing the state where the rotational tool mounting member unit 29 is in a down position after the stand-by state of FIG. 10, as being partly enlarged. FIG. 11(a) is an enlarged cross-sectional view showing the tool changer 80 and the rotational tool mounting member unit 29 as being partly enlarged, as viewed from the side and FIG. 11(b) is an enlarged cross-sectional view which is taken along line B-B of FIG. 11(a), as viewed from above. In the stand-by state, upon receiving a command for mounting the rotational tool 33 from an operation means or program which is not shown, the controller 39 drives the slide driving means 31 of the FSW body 26 in the stand-by state to cause the rotational tool mounting member unit 29 to move down. By causing the rotational tool mounting member unit 29 to move down, the axis alignment portion 76 of the tie-in portion 74 is easily inserted into the fitting hole 61.

By causing the rotational tool mounting member unit 29 to further move down, the tie-in portion 74 is fitted into the fitting hole 74 and the plurality of pin members 67 are respectively inserted into the plurality of insertion grooves 58. In this case, when the tie-in portion 74 is fitted into the fitting hole 61, the axis alignment portion 76 moves up while sliding on the inner peripheral surface of the tapered portion 62 of the fitting hole 61. Thereby, the alignment is made so that a difference between the axis of the rotational tool 33 and the axis of the rotational tool retaining member unit 37 is further reduced.

By causing the rotational tool mounting member unit 29 to further move down, the rotational tool retaining member unit 37 presses the tie-in portion 74 so as to press down the spring receiver 68 supporting the tie-in portion 74. As a result, as shown in FIG. 11, the pin members 67 move up in the insertion grooves 58 and reach the rotation guide groove 57. The controller 39 causes the rotational tool mounting member unit 29 to move down up to a state where the down movement is completed. In this case, the load exerted by the rotational tool mounting member unit 29 on the machine tool mounting platform 83 which results from the down movement of the rotational tool mounting member unit 29 is absorbed by the spring member 84. However, if a load that is too large to be absorbed by the spring member 84 is exerted on the machine tool mounting platform 83, that is, the machine tool mounting platform 83 moves down beyond the predetermined allowable range, the limit switch 89 activates and the controller 39 stops the driving of the slide driving means 31. Thus, the mounting operation (changing operation) of the rotational tool 33 is stopped.

Figure 12:
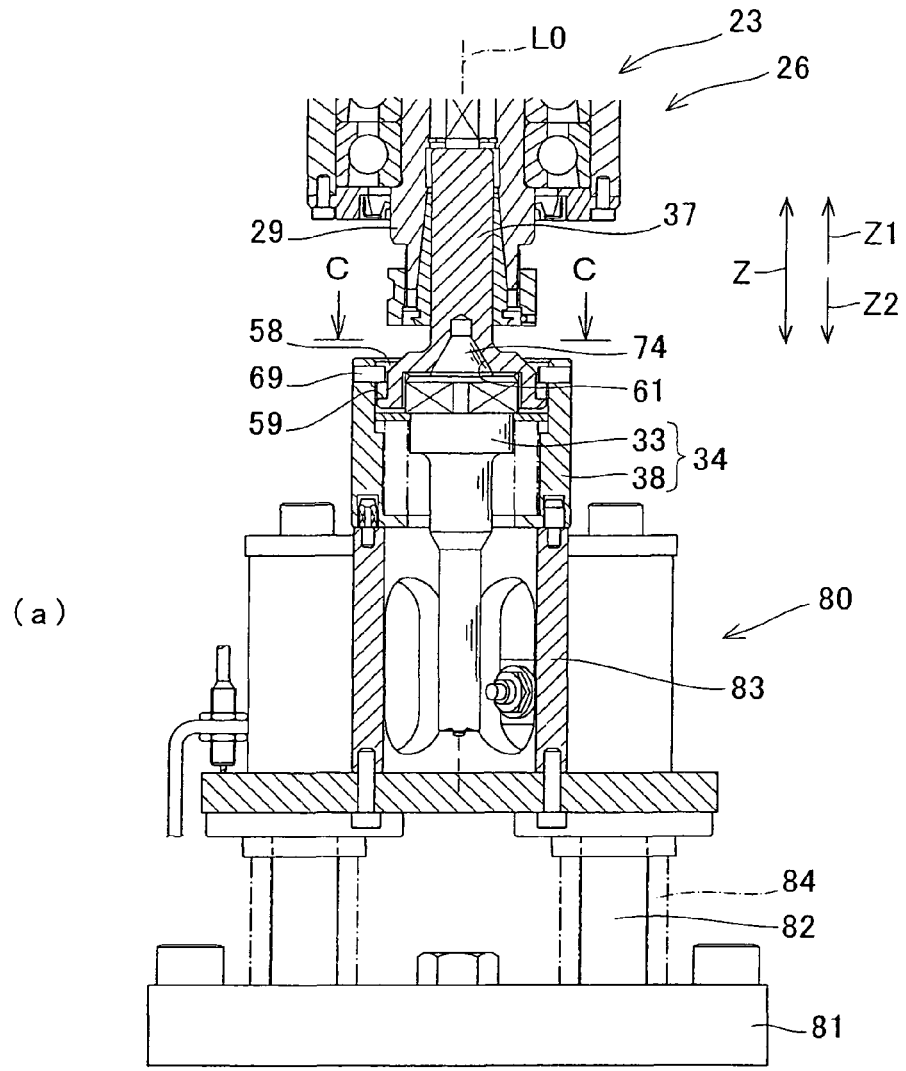
FIG. 12 is an enlarged cross-sectional view showing a state where the rotational tool mounting member unit is rotated after the state where the down movement is completed as shown in FIG. 11, as being partly enlarged.
Figure 12:
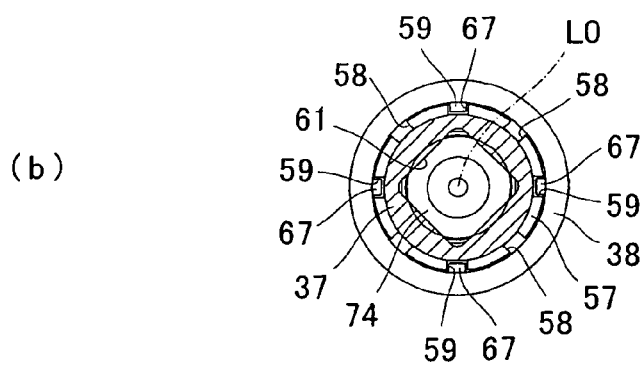

FIG. 12 is an enlarged cross-sectional view showing the state where the rotational tool mounting member unit 29 is rotated after the state where the down movement is completed as shown in FIG. 11, as being partly enlarged. FIG. 12(a) is an enlarged cross-sectional view showing the tool changer 80 and the rotational tool mounting member unit 29 as being partly enlarged, as viewed from the side, and FIG. 12(b) is an enlarged cross-sectional view taken along line C-C of FIG. 12(a), as viewed from above. In the state where the down movement is completed, the controller 39 stops the down movement and then drives the rotation driving means 30 to rotate the rotational tool mounting member unit 29 around the reference axis L0. This causes the plurality of pin members 67 to move in the circumferential direction within the rotation guide groove 57. When the rotational tool mounting member unit 29 is rotated 45 degrees, the pin members 67 are respectively disposed above the engagement recesses 59 as shown in FIG. 12.

Figure 13:
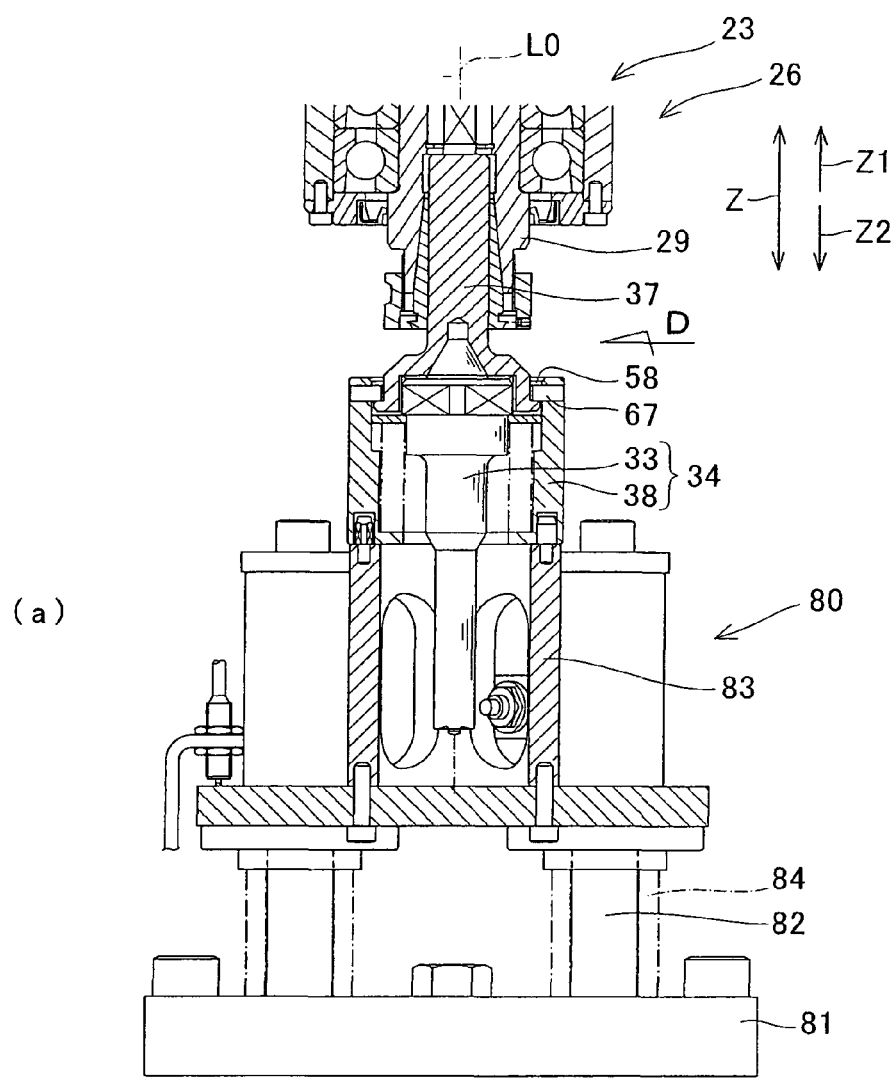
FIG. 13 is an enlarged view showing a state where the rotational tool unit is mounted to the rotational tool mounting member unit of FIG. 12, as being partly enlarged.
Figure 13:
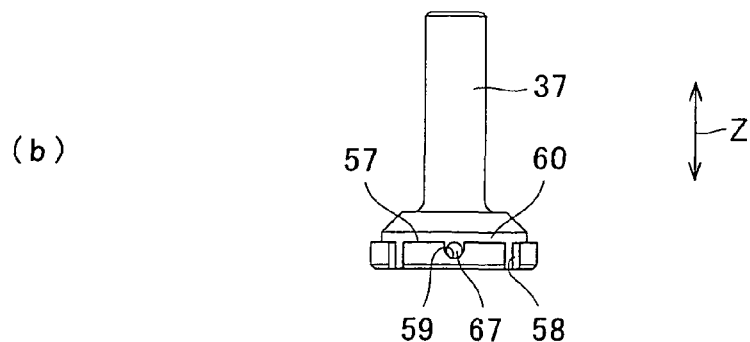

FIG. 13 is an enlarged view showing the state where the rotational tool unit 34 is mounted to the rotational tool mounting member unit 29 of FIG. 12, as being partly enlarged. FIG. 13(a) is an enlarged cross-sectional view showing the tool changer 80 and the rotational tool mounting member unit 29 as being partly enlarged, as viewed from the side, and FIG. 13(b) is an enlarged side view in the direction of the arrows D of FIG. 13(a), showing the positional relationship between the rotational tool retaining member unit 37 and the pin member 67 in the state where the rotational tool unit 34 is mounted to the rotational tool mounting member unit 29. When the plurality of pin members 67 are disposed above the plurality of engagement recesses 59, respectively, the controller 39 causes the rotational tool mounting member unit 29 to move a little up. At the same time, the biasing member 69 presses the rotational tool retaining member unit 37 up. This causes the pin members 67 to be inserted and fitted into the engagement recesses 59 as shown in FIG. 13(b). At this time, since the pin members 67 are fitted into the engagement recesses 59 with the rotational tool retaining member unit 37 being subjected to an upward force, the pin members 67 are fitted into the engagement recesses 59, respectively such that the pine members 67 are inhibited from coming off the engagement recesses 59. This makes it possible to inhibit the pin members 67 from inadvertently coming off the engagement recesses 59 after the mounting.

By moving down and rotating the rotational tool mounting member unit 29 as described above, the pin members 67 move in the mounting passages 60 and are guided to the engagement recesses 59 which are the tip end portions of the mounting passages 60. In this manner, the rotational tool unit 34 can be automatically mounted to the FSW gun body 26.

Figure 14:
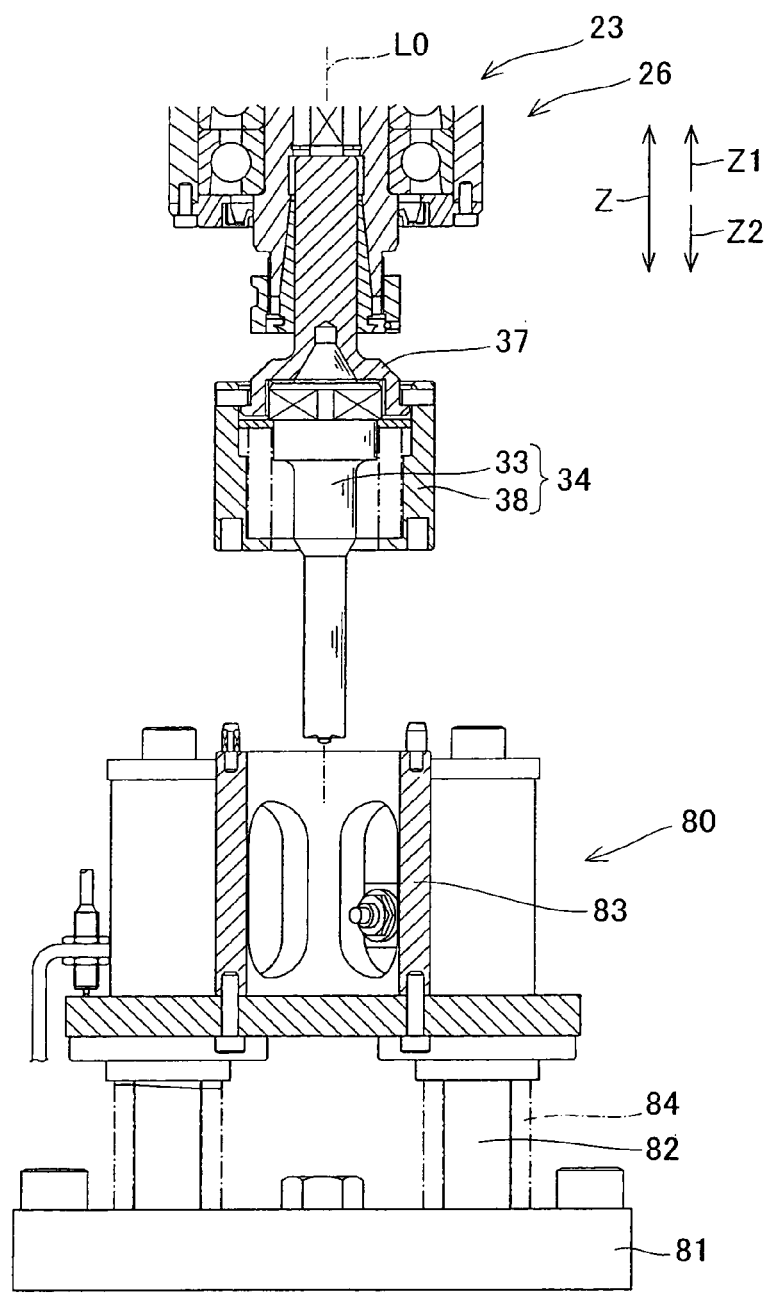
FIG. 14 is an enlarged cross-sectional view showing a state where the rotational tool unit of FIG. 13 is detached from the tool changer, as being partly enlarged.

FIG. 14 is an enlarged cross-sectional view showing the state where the rotational tool unit 34 of FIG. 13 is detached from the tool changer 80, as being partly enlarged. When the rotational tool unit 34 is mounted to the FSW gun body 26, the controller 39 causes the rotational tool mounting member unit 29 to move up to detach the mounting member unit 38 from the machine tool mounting platform 38 as shown in FIG. 14. Thereby, the mounting of the rotational tool 33 is ended.

The rotational tool unit 34 is detached by the operation which is the reverse of the mounting operation. To be specific, first, the controller 39 causes the robot 22 to place, above the tool changer 80, the rotational tool mounting member unit 29 to which the rotational tool unit 34 is mounted. A this time, the rotational tool mounting unit 29 is placed so that the friction stir welding portion 75 of the rotational tool 33 is disposed inside the mounting platform 86 and the positioning holes 71 of the rotational tool 33 are disposed to respectively correspond to the positioning pins 88, respectively, as viewed from above. Then, the controller 39 causes the rotational tool mounting member unit 29 to move down and the rotational tool unit 34 to be mounted to the machine tool mounting platform 83. At this time, the positioning pins 88 are fitted into the positioning holes 71, so that the mounting member unit 38 is unable to rotate with respect to the mounting platform 83.

The controller 39 causes the rotational tool mounting member unit 29 to further move down to cause the spring receiver 68 to move down. This causes the plurality of pin members 67 to come off the engagement recesses 59, respectively. In this state, the controller 39 causes the rotational tool mounting member unit 29 to rotate to move up the plurality of pine members 67 to a position above the insertion grooves 58. Finally, the controller 39 causes the rotational tool mounting member unit 29 to move up to detach the rotational tool retaining member unit 37 from the rotational tool unit 34. With such an easy control, the rotational tool 33 can be detached from the rotational tool retaining member unit 37.

Thus, by using the tool changer 80, the rotational tool 33 can be changed by the rotation function and sliding function of the FSW gun body 26. Therefore, it not necessary to incorporate an additional function into the FSW gun body 26. Therefore, the conventional FSW gun body 26 is conveniently used.

Figure 15:
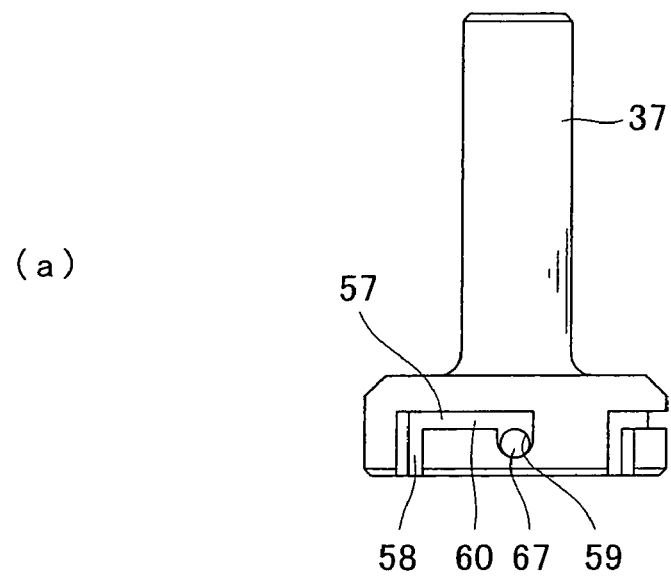
FIG. 15 is a side view showing another configuration of a mounting passage.
Figure 15:
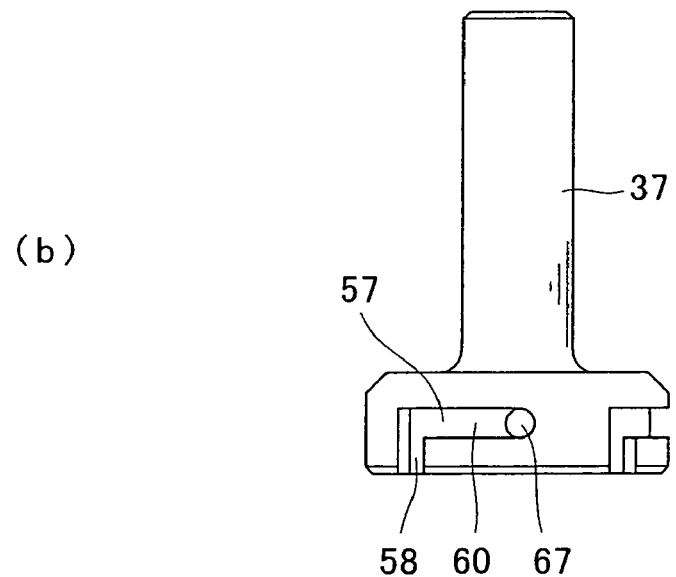
Figure 16:
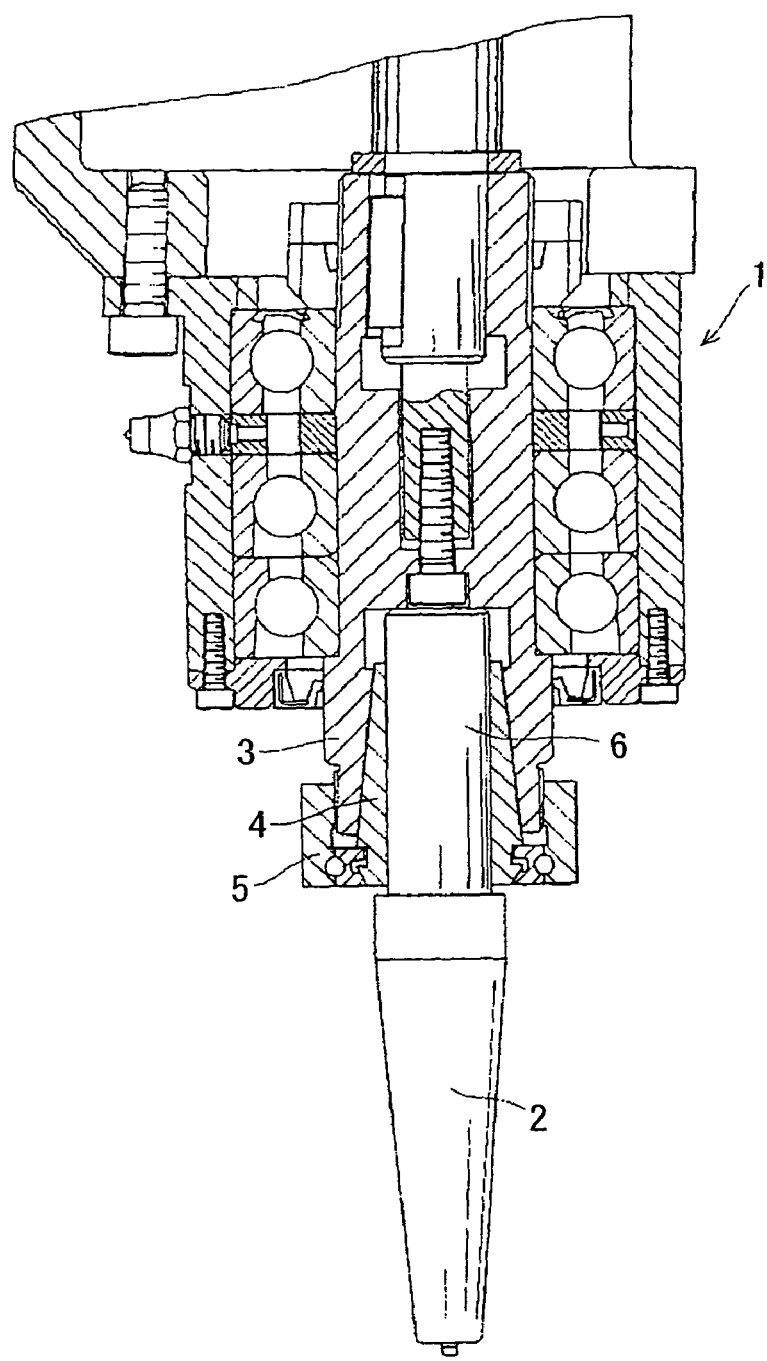
FIG. 16 is a cross-sectional view showing a rotational tool retaining member unit according to a first related art.
Figure 17:
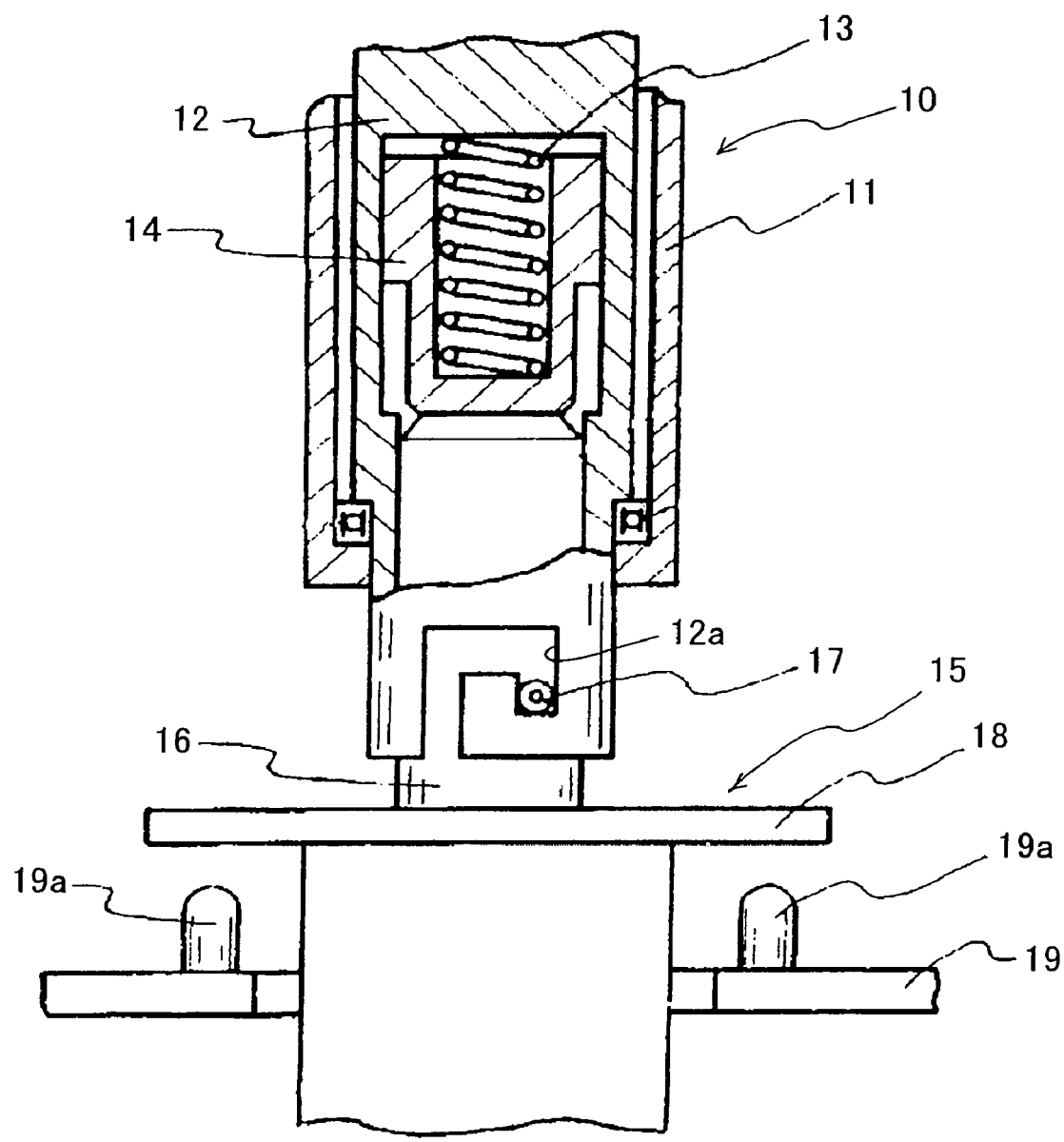
FIG. 17 is a cross-sectional view showing a robot hand and a grip according to a second related art.

Whereas in this embodiment, the mounting passages 60 are formed on the outer peripheral surface of the rotational tool retaining member unit 37, the mounting passages 60 may be formed on the inner peripheral surface thereof. In this case, the rotational tool retaining member unit 37 is configured such that the other end portion in the rotational axis direction covers the mounting member unit 38 and the mounting member unit 38 is configured such that the plurality of pin members 60 move in the mounting passages 60 while protruding from the outer peripheral surface of the mounting member unit 38. Whereas in this embodiment, the mounting passages 60 are hook-shaped, they may have other shapes. A part of the mounting passages 60 may be hook-shaped. To be specific, as shown in FIG. 15(a), adjacent rotation guide grooves 57 may not be connected to each other. As shown in FIG. 15(b), the engagement recesses 59 may be omitted. In this case, instead of the compressive spring, a torsion spring is used as the biasing member 69 to exert a force to cause the rotational tool retaining member unit 37 to rotate, thereby inhibiting the pin members 67 from being coming off.

In this embodiment, the C-shaped FSW gun 23 provided with the C-shaped support frame 27 has been described. The present invention is not limited to the C-shaped FSW gun, but other shapes may be used so long as the FSW gun is mountable to the robot 22.

The above embodiments are merely exemplary, and its structure can be changed within a scope of the invention.

The invention claimed is:

1. A friction stir welding apparatus configured to mount a machine tool to a friction stir welding apparatus body, comprising:
   a retaining means which is mounted at one end portion thereof to the friction stir welding apparatus body and is provided with a plurality of mounting passages on a peripheral surface of the other end portion thereof, the mounting passages being arranged to be spaced apart from each other in a circumferential direction and having opening ends which open on an opposite side of the one end portion;
   a mounting means having a plurality of mounting members which are respectively inserted through the opening ends of the plurality of mounting passages and are respectively fitted to tip end portions of the plurality of mounting passages;
   a machine tool provided on the mounting means, the machine tool being fitted at one end portion thereof to the other end portion of the retaining means and having a friction stir welding portion at the other end portion thereof, wherein
   the mounting means is provided with a biasing means configured to exert a force on the machine tool toward the retaining means.

2. The friction stir welding apparatus according to claim 1, wherein
   a fitting hole is formed on the other end portion of the retaining means so as to extend thereinto in a rotational axis direction and to open in the same direction that the opening ends of the mounting passages open,
   the machine tool has a tie-in portion at one end portion thereof to protrude in the rotational axis direction, and
   the tie-in portion is fitted to the fitting hole.

3. The friction stir welding apparatus according to claim 2, wherein
   at least a part of the fitting hole of the retaining means has a tapered portion formed around a rotational axis of the machine tool, and
   at least a part of the tie-in portion of the machine tool has an axis alignment portion having a tapered shape which is formed around the rotational axis of the machine tool so as to conform to the fitting hole.

4. The friction stir welding apparatus according to claim 2, wherein
   at least a part of the fitting hole of the retaining means has a non-circular portion formed in a non-circular shape as viewed from the rotational axis direction, and
   at least a part of the tie-in portion of the machine tool has a rotation inhibiting portion having a non-circular shape so as to conform to a non-circular portion of the fitting hole.

5. The friction stir welding apparatus according to claim 1, wherein
   the plurality of mounting passages are formed to have a hook shape and have a rotation guide groove which is connected to the opening ends and the tip end portions and extends in the circumferential direction, and
   the rotation guide groove of adjacent mounting passages extends continuously.

6. A friction stir welding system comprising:
   friction stir welding apparatus according to claim 1;

a controller configured to control rotation and movement of the retaining means; and a machine tool changer configured to mount the mounting means into which the machine tool is inserted, wherein the mounting means is mounted to the machine tool changer such that the mounting means is unable to rotate around a rotational axis of the machine tool.

7. The friction stir welding system according to claim 6, wherein the machine tool changer includes:

a base;

a mounting platform configured to mount the mounting means;

a support means which is provided at one end portion thereof with the base and at the other end portion thereof with the mounting platform which is movable close to and away from the base;

a mounting platform biasing means configured to exert a force on the mounting platform in a direction away from the base and to absorb a load applied to the mounting platform in a direction closer to the base; and a detecting means configured to detect whether or not a displacement of the mounting platform in a direction closer to the base is beyond a predetermined allowable range, and the controller is configured to stop movement of the retaining means according to a detection result of the detecting means.

* * * * *